J. M. W. KITCHEN.
BOTTLE CLOSURE.
APPLICATION FILED JAN. 3, 1914.
1,141,553.
Patented June 1, 1915.
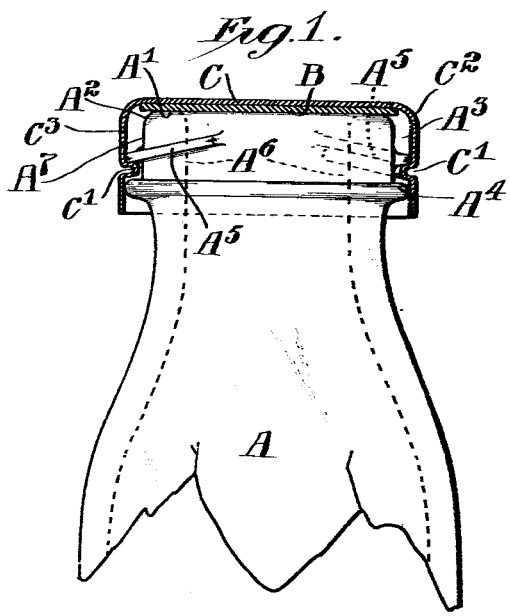
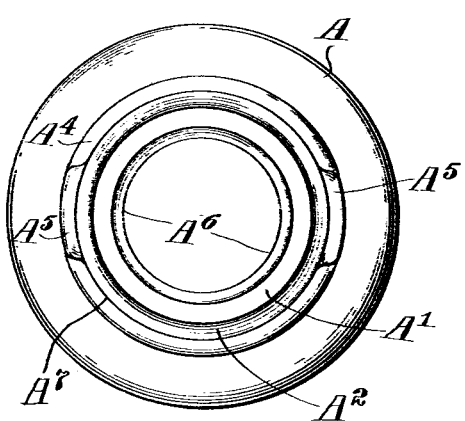
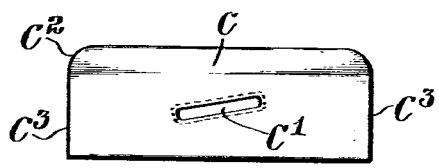
Inventor:
J. M. W. Kitchen
by Geo. L. Wheelock, Atty

UNITED STATES PATENT OFFICE.

JOSEPH MOSES WARD KITCHEN, OF EAST ORANGE, NEW JERSEY.

BOTTLE-CLOSURE.

1,141,553.  Specification of Letters Patent.  Patented June 1, 1915.

Application filed January 3, 1914. Serial No. 810,105.

*To all whom it may concern:*

Be it known that I, JOSEPH MOSES WARD KITCHEN, a citizen of the United States, residing in the city of East Orange, county of Essex, State of New Jersey, have invented a new Bottle-Closure, of which the following is a specification.

The principle objects of the present invention have been to provide for an efficient performance of the process of pasteurizing milk or cream in the final container, and for preventing at any time the infection of the contents of the container and the exterior of the lip of the container, and of any compressible seal used.

In other respects the container may be a bottle such as is commonly used for delivering milk to the consumer.

The invention can be used for other bottle closure purposes; but is specially designed for use in milk bottles, and is an excellent sanitary container for raw milk and other products.

The ordinary milk bottle, in which is used a paper sealing disk resting on a recessed seat on the interior of the upper part of the neck of the bottle, is defective from a sanitary point of view. It is not adapted to perform pasteurization in the bottle of the contents of the bottle. Such a bottle closure acts as a recipient and retainer of milk exuded from the interior of the bottle, which retained milk undergoes decomposition. A seal of this character does not prevent infection of the bottle's contents by rain, snow, atmospheric dust, flies, and animal and other contaminations; such infections being conveyed into the bottle from the infected periphery of the paper disk. The external lip of such a container is also infected by the soiled hands of the driver-distributer and the household receiver; the bottle being usually handled by its upper extremity.

The present invention overcomes the objections relating to the old style of bottle, as well as to the objections pertaining to other forms of bottle closures.

The improvements in the present invention are indicated in the accompanying drawings, in which—

Figure 1 represents in elevation, the upper part of a milk bottle, with the paper disk seal, and a superimposed metal cap which is broken away, showing in section. Fig. 2 represents a plan view of the upper part of the bottle. Fig. 3 represents in elevation, the metal superimposing cap of the bottle closure.

A is the upper part of the bottle which is represented in elevation.

$A^1$ is the horizontally arranged sealing seat of the bottle.

$A^2$ is an outward, downward and uniformly annularly maintained curved surface of the bottle lip.

$A^3$ is an annular air-band space having a special capacity in its relation to the size of the bottle.

$A^4$ is an annular bellring.

$A^5$ are glass locking lugs projecting outwardly from the lip at a level below the curved surface $A^2$.

$A^6$ is the perpendicular inner surface of the lip.

$A^7$ is the perpendicular outer surface of the lip.

B is the paper sealing disk.

C is the metal superimposing cap, which is integrally one piece and imperforate as to its crown and sides.

$C^1$ are two equidistantly and oppositely placed instruck lugs having an engaging surface pitched from a horizontal plane in one pitch. They engage with the glass lugs $A^5$.

$C^2$ is the curved surface of the metal cap C which is especially designed for conditionally centering the disk B.

$C^3$ are the perpendicular sides or skirt portion of the metal cap.

It will be noted that the interior and neck of the bottle is without the usual cap seat. This construction not only prevents the collection of decomposed milk in the neck of the bottle, but also enables the entire surface of the interior of the bottle to be more easily and thoroughly cleaned.

The cap sealing seat $A^1$ is of considerable width, and preferably is flat and substantially on a horizontal plane. The downward curvature $A^2$ extends from the sealing seat $A^1$ to the perpendicular surface in its annular extent $A^7$. It will be noted that this curvature has no irregularities of surface. Preferably there is a small downward curvature extending inwardly from the sealing seat. The sealing seat, if desired, may be curved; and that form is more easily manufactured and cleaned. Inasmuch as a very powerful downward pressure by the top of the cap can be exerted by the action of the locking lugs of the bottle and cap, a sufficient seal may be affected in variations from a horizontal, flat, sealing surface.

The paper sealing disk B is preferably a plane disk without variations in its surface, although such variations may be comprised in it, such as a curvature harmonizing in conformation with the curvature of the lip. When moist and warm the disk has more or less of its surface molded around and conformed to the upper surfaces of the lip. This sealing disk extends outwardly over and is peripherally spaced from the curvature $A^2$. It is of such a size in relation to the interior diameter of the metal cap, that when it is entirely centered, it does not touch with its peripheral edges the inwardly curved side $C^2$ of the cap C. Preferably this sealing disk is of a diameter extending entirely over the two external peripheries of the sealing seat $A^1$ to one side of the curved centering surface $C^2$. These several provisions enable a sufficiently accurate centering of the paper disk to secure a seal by the automatic centering action of the curved centering surface $C^2$ when the metal cap is locked in place, the paper disk being horizontally shifted sufficiently to cover the mouth of the bottle, and without bending the plane surface of the disk. The extension of the disk over the curved surface provides for the removal of the disk by a thumb and finger without any infecting manual or instrumental contact being made with the contents of the bottle or with the external surface of the bottle lip.

It will be noticed that the interior of the annular centering curvature either in itself or at its junction with the crown and skirt portions of the cap and other parts of the bottle closure, are free from indentations and variations of surface, and that the shape of the sealing surfaces of the cap and lip conform as to their relative shapes. The plane surfaces of the cap and bottle lip conduce to cleanliness and avoidance of the adhesion of infecting material in this closure.

The paper disk seal B is supposedly discarded after once using. The disk B while extending sufficiently outward to enable it to be removed with sanitary efficiency, preferably does not extend sufficiently outward to allow of its edges becoming jammed within the sides of the metal cap. In fact its edges are preferably so spaced from the sides of the cap as to allow it to move horizontally on the sealing seat when the metal cap is being locked. When the metal cap is not in place, the disk B is freely movable, requiring no prying or tilting, and can, automatically drop out of the cap cavity when the cap is removed from the bottle top.

The metal cap C by means of its specially arranged for store of sterilized air, pneumatically protects the edges and other parts of the paper sealing disk from the infections that usually are brought into contact with milk bottle and other tops, some of which infective material is likely to be tilted into the bottle when the ordinary seal is removed from the usual recess seat. With my bottle closure, ice containing specks or other impurities can be piled on the metal cap without infecting or contaminating the top of the paper seal or the lip of the bottle. In decanting the milk from this bottle, that action is usually done by holding the cap in one hand and the bottle in the other, while the milk is being poured from the bottle. This action naturally tends to secure the return of the cap by its holder onto the bottle lip as a protection to the mouth of the open bottle, during the intermittent use of the contents of the bottle, inasmuch as the cap would have to be put down somewhere from the holder's hand. Some undetachable closure devices act to prevent the bottle from being intermittently closed because of an attached cap, it being inconvenient or difficult to replace by the person handling the bottle. The cap C is an effective and convenient cover for the bottle mouth during the intermittent periods of removal of the contents of the bottle.

In pasteurizing the contents of the bottle, a very considerable height of the sides $C^3$ is desirable in order that a sufficient volume of sterilized air be retained under the cap to prevent the entrance of outside air or water to the seal of the bottle or into the bottle. But the sides $C^3$ may be so short that the lowest edge forms a seal with the annular bell-ring $A^4$ at the level of the greatest protrusion of the bell ring, or immediately above that level; the upper vertical curvature of the bell ring acting through its peculiar form to gradually bring the centering sealing part of the sides $C^3$ into contact with the sealing part of the bell ring $A^4$. The metal edge of the cap C is thin, and its lower edge being somewhat flexible, conforms to moderate irregularities in the surface of the bell ring $A^4$, which along with the guidance of the glass lugs on the bottle lip, guides the cap accurately to its upper sealing seat. It will be noted that the curvature of the bottle lip and the curvature of the metal cap, are formed with equal radii, thus providing for an approximately close fit between the two, with an interposed paper seal of a sufficiently large size to be crowded down between the two curvatures. These curvatures may be specially formed to fit together without a paper seal. In case no paper seal is used, the two curvatures will then form part of the surface of a conditional seal. In certain cases in which milk is pasteurized in the bottle by a method which I disclose in my co-pending application Serial No. 740,962, filed Jan. 9, 1913, in which the bottles to be treated are both heated and cooled in the same apartment, and in which the atmosphere of the apartment is substantially free from infecting germs; the milk can be pasteurized without the use of a paper disk, the two conditional seals being then practically all that is needed to prevent the entrance of germs into the bottle after the bottles have been removed from the pasteurizing department subsequent to the cooling of the milk. When the milk is cooled in the apartment in which it is heated and the milk shrinks in its cooling, whatever air is drawn into the bottle is practically germless; and as the milk is finally handled in a deeply chilled condition, there are practically no air currents between the atmosphere on the exterior of the bottle and the interior of the bottle. When the bottle closure is used without the paper sealing gasket in the way just specified, there is not so large an air space provided for between the sides of the lip and the metal cap. In this case the metal cap is clamped down on the bottle top and the two curvatures $A^2$ and $C^2$ and the horizontal sealing surface make a close conditional seal which acts in connection with the lower conditional seal at the level of the bell ring $A^4$. In that case the aseptic condition of the pasteurized atmosphere outside of the cap C makes it unnecessary to have so much space inside of the cap C. In that case also, the horizontal, flat sealing surface $A^1$ need not be as wide as when the sealing disk gasket is used.

An air tight sealing of the bottle is to be preferred, and this is accomplished through the use of a compressible sealing gasket, and notwithstanding that such sealing method increases the cost of the milk.

The metal cap C is repeatedly used until too much worn. It is generally stamped from one single piece of rolled sheet metal, and is impervious to air or water through its sides and crown, and makes a cupped bell which fits over the entire lip of the bottle. This cap has two oppositely placed instruck lugs $C^1$ which lock under the glass lugs $A^5$, clamping the metal cap firmly down upon the sealing disk B. The glass and metal lugs are so situated and have only such horizontal length as to allow of the metal cap being brought vertically down to its permanent seat level; and the glass lugs and the bellring $A^4$ have sufficient projection from the lip to provide for an adequate air space between the vertical sides of the bottle lip and the vertical sides of the skirt portion of the imperforate cap, to contain a volume of sterilized air. The volume of sterilized air provided for in this space, is at least relatively as large as the volume of air or other gases expelled from the bottle during the heating of the bottle. This space should preferably be sufficiently great to contain a volume of gas not less in amount than one two-hundredth of the volumetric capacity of the bottle used in connection with this closure. The skirt portion of the cap C has a depth of not less than one-half of one inch, which height allows through its vertical expansion under the influence of heat, for gases to pass out of the bottle, and provides for containing a vertically high band of air adequate to pneumatically prevent the infection of the sealing disk or sealing surface of the lip of the bottle. A still greater height to the skirt portion is desirable. The locking of the lugs holds the elements of the closure in position, makes a retained seal between the paper seal B and the seal seat $A^1$.

The compress on surface of the metal cap that is located over the annular sealing seat $A^1$ is preferably in a flat horizontal annular plane and of a width equal to the sealing seat $A^1$. Inasmuch as the sealing disk is thin, and limited in its compressibility, a considerable width of the annular surfaces of the metal cap and bottle lip are needed to secure an air tight seal.

The skirt portion of the metal cap is of an unusual depth. This unusual depth has for object, (1) to furnish sufficient air band space around the lip of the bottle, (2) to allow through the expansion of the metal, a conditional opening of the high level seal during the process of pasteurizing the milk, and thus allowing for the escape of gases from the bottle, and (3) to give a sufficient rigidity to the metal cap to firmly hold the crown portion of the cap in a horizontal plane during the compression of the sealing disk. To facilitate quickness and simplicity of action in handling the bottle during its closing and opening, I use only two compression lugs equidistantly and oppositely placed on the skirt portion of the cap; and if the skirt portion of the cap were not of unusual depth it would require a larger number of lugs to effect an efficient sealing of the bottle, and the use of a thicker and more expensive paper sealing disk. This depth of the skirt portion, provides for the pneumatic retention under the cap of enough warm, sterilized air during the cooling of the bottle. In the pasteurizing process, whether by total immersion of the bottle under water, or in spraying with unsterilized water, or by contact with cold air, the weight of the atmosphere outside of the metal cap being greater than the lighter warm air inside of the cap, and which air is warmed by the heated contents of the bottle, that air is retained under the cap. Hence under the force of gravity the warm sterilized air remaining under the cap during the process, is drawn into the bottle if any air enters the bottle during the cooling process. The bell ring $A^4$ as well as the glass lugs $A^5$, extend outwardly substantially equal distances from the perpendicular surface A⁷ and more than is necessary to provide for the mere locking structures of the closure. Both bell ring and lugs help to guide the metal cap C to a permanent seat, and prevent side play of the cap. This unusual projection of the bell ring and lugs provides adequate space between the sides of the bottle lip and the sides of the cap for containing the relatively large volume of air that becomes sterilized in the heating of the bottle. This is an important feature in preventing infections of the pasteurized milk.

The curvature C² centers the paper seal B on to the sealing seat A¹. The paper disk gasket is of such size that even if it is not perfectly centered on the sealing surface of the bottle, and if it touches one side of the cap curvature C², it still will cover the entire sealing seat A¹. In closing the bottle, the paper disk B may touch one or more parts of the annular part C² without becoming jammed in the cap, a condition that I aim to avoid in this invention, inasmuch as the paper gasket seal should easily gravitate from the metal cap after once using. As the metal cap is locked in place the skirt portion of the sides C³ extend to or below the most protuberant part of the bell ring A⁴, where is provided a secondary, partly air-tight or conditional seal, which while allowing fluids to gravitate outside the air cavity A³, prevents insects, dust and other matters from passing up into the considerable air space inside of the metal cap.

It is intended to provide an adequate space in the metal cap above the bell ring, to contain a volume of air equal at least in volume to what may be forced out of the bottle during its heating. Milk which may exude during its heating between the paper seal and the outside of the bottle, gravitates down and does not return into the bottle. During the heating of the bottle the upper expansion of the sides of the metal cap opens the top seal partly, allowing gases and air to escape during the process of heating; but when the bottle cools after its heating, any air that may be drawn into the bottle by an induced vacuum, is taken from the store of sterilized air surrounding the lip of the bottle. During the process of pasteurization, the entire lip of the bottle as well as its sealing disk becomes sterilized, and the superimposed metal cap, which is imperforate as to its crown and sides, prevents infecting contaminations of the bottle lip.

The neck of the bottle below the bell ring A⁴ is preferably drawn inward, which form allows for the grasp of the distributor and receiver to be more easily maintained during the handling of the bottle by contact with the glass surface of the neck and bell ring, which is usually grasped by the lip and closure device of the bottle. This provision measurably protects the hand from being injured by the thin partly flexible lower edge of the metal cap. The unusual space provided for the containing of sterilized air, and the peculiar form of the bell ring on the lip of the bottle which extends outwardly so far from the sides of the neck, is of material aid in the grasping and holding of the bottle lip.

What I claim as new is:

1. In a bottle closure, the combination of, (1) a lip, and (2) a coöperating compression closure cap for the lip, said lip and said cap comprising means for causing the downward compression of parts of the cap upon said lip, said closure cap having an internal diameter sufficiently greater than the exterior of the neck of the bottle closed by the bottle closure, to provide an annular space or chamber surrounding said lip adapted to contain gas in amount not less than one two-hundredth of the volumetric capacity of the bottle closed by said closure, said cap having a skirt portion approximately of a height of and not less than one-half of one inch to allow through its vertical expansion under the influence of heat, for gas to pass out from said bottle during the heating of the bottle, and for containing a band of air to pneumatically prevent the infection of the upper level of said lip from infected air or moisture from without said cap.

2. In a bottle closure, the combination of, (1) a lip, and (2) a compression closure cap coöperating with said lip, said lip and said cap having the following features: a vertical side surface to said lip, a sealing surface at the upper level of the lip, a conditional seal at the lower level of the lip, an outward and downward curvature of the lip projected from the highest level of the lip, said curvature having annularly a uniformly uninterrupted and smooth surface; said cap having a vertical skirt part and a horizontal part and a curved centering surface connecting the vertical skirt part and the horizontal part of the cap; said curved surfaces having equal radii, said curved part in the cap gradually merging from and with the skirt portion to and with the horizontal portion of the cap and being free from indented irregularities in the curved surface or the parts immediately adjacent to the curved surface; the vertical outer side surface of said lip and the vertical skirt part of said cap being of sufficient difference in horizontal diameter to provide a space between them for containing an amount of gas equal to the amount of gas or other matter ejected from the interior of the bottle when the contents of the bottle is heated at a temperature destructive to pathogenic germs, said space approximating one two-hundredth of the volumetric capacity of the bottle closed by said closure.

3. In a bottle closure, the combination of, (1) a lip, (2) a coöperating metal cap, said lip and cap having the following features: an outwardly and downwardly curved surface projecting annularly from the upper level of said lip, locking lugs on the lip at a level below said curved surface, a bellring on said lip; a curved surface in the metal cap of substantially the same vertical radius and approximate horizontal annular diameter as the curvature projected from the lip and fitting to and forming with the projected curvature of the lip a conditional seal, locking lugs in the vertical sides of said cap at a level below the curved surface in the metal cap, said cap having a skirt portion of a horizontal diameter substantially equal to the horizontal external diameter of said bellring and conditionally closely fitting to the bellring during a vertical movement of said cap in securing sealing of said closure; said curved surfaces, the peripheral parts of the horizontal parts of the cap, and said skirt portion being free from any shoulder, indentation or other irregularities of surface except as to instruck lugs in said skirt portion.

4. In a bottle closure, the coöperating combination of, (1) a neck, (2) a lip, (3) an imperforate cap for the lip, and (4) a sealing gasket compressed between the lip and the cap, said combination having the following features: an outward and downwardly rounded and an annular horizontal uninterrupted surface to the lip, a horizontal annular sealing surface to the lip, a bellring on the lip at a low level of the lip, said bellring forming a conditional seal at said low level, two glass cam lugs on said lip at a level below the curved portion of the lip for engagement with the cam lugs of the cap; a horizontal annular sealing surface in the cap vertically located over the sealing surface, a vertical skirt part and a peripheral horizontal part to the cap and a curved gasket centering surface without indentation or irregularities of surface of the parts connecting said skirt part and said peripheral horizontal part or immediately adjacent to them, two oppositely placed instruck cam lugs in the skirt portion of the cap at a level below the curved portion of the lip, and (3) an indrawn part of the neck of the bottle at a level immediately below the skirt portion of the cap and bellring.

5. In a bottle closure, the combination of, (1) a bottle lip having a horizontal annular sealing surface on said lip and an outward and downward curvature extending from said sealing surface; said lip having a bellring annularly surrounding the lip at a low level of the vertical skirt part of the cap and forming a conditional seal with a vertical skirt part of a cap, said lip comprising glass compression lugs on the lip; (2) a cap for the lip, said cap having a flat horizontal compression surface pressing against the horizontal sealing surface, a vertical skirt part, a vertically curved centering surface connecting the peripheral horizontal part of the cap with the vertical skirt part of the cap, compression lugs in the vertical part of the cap; and (3) a detachable disk-gasket coöperatively joining the lip and the cap, said gasket being larger in diameter than the said sealing surface of said lip; said vertical skirt part of the cap having an annular surface without indentations other than said compression lugs; said glass compression lugs having a horizontally outward projection between the lip and the cap greater than is needed to secure the compression of and retention of the disk-gasket against said sealing surface, such extended projection of said glass lugs and said bellring providing for an adequate air space surrounding said lip for holding a volume of sterilized air relatively equal in bulk to the air forced from said bottle in the heating of the bottle, the inner side of the skirt part and curved centering surface and peripheral horizontal surface of the cap being smoothly merged and entirely free from indentation, shoulder or other interrupted smoothness of surface.

6. In a bottle closure, the coöperative combination of, (1) a lip having a horizontal sealing seat at the highest level of the lip, an annular uniformly surfaced outward and downward vertical curvature projected from the horizontal sealing surface, (2) a horizontally movable and centerable sealing disk covering the open mouth of the bottle and sealing seat and extending outward over the outward and downward curvature, said extension of the sealing disk providing for the removal of the sealing disk by its peripheral edge without manual or instrumental contact with the lip or contents of the bottle, and (3) a superimposed imperforate cap, said cap having means for compressing downwardly and retaining said sealing disk in place on said lip, said superimposed cap having a vertical curvature for centering said disk on said sealing surface.

7. In a bottle closure, the combination of, (1) a lip having substantially vertical sides, a high level horizontal sealing surface on said lip and a low level annular bellring having vertically curved surfaces at the top and at the bottom of the bellring, the most external protuberant curved part of said bellring spacing the cap sides from the vertical sides of said lip and forming a chamber around said lip, said chamber having for purpose the storage of a covered contained antiseptic band of gas, (2) a bell-cap having a vertical skirt portion extending down to the upper curved part of said bellring and providing fo a conditional seal with said curved part, said vertical skirt part being of a unindented form except as to two compression lugs internally projecting or instruck from said sides, and an unindented and uninterruptedly smooth centering curvature at the top of said cap skirt portion smoothly merged with the skirt part and the horizontal part of the lip, and (3) a detachable horizontal disk-gasket covering said sealing seat of said lip and compressed thereon by said cap, said disk-gasket when completely centered on said lip not touching any part of the centering curvature of said bell-cap but being of sufficient diameter to cover the sealing seat when horizontally placed and touching one side of the centering curvature of said cap.

8. In a bottle closure, the combination of, (1) a lip comprising a sealing surface and an annular uniformly maintained downwardly extending vertically curved surface projected from said sealing surface, (2) a sealing disk of a compressible material, said disk having a diameter greater than the sealing surface, and (3) an imperforate superimposed bell cap having vertical sides and a curved centering surface, and also compresing means for coöperatively acting in compressing said disk against said sealing surface, the curved surface projected from said sealing surface being annularly uniformly and uninterruptedly downwardly spaced from said sealing disk at the outer periphery of the disk, said disk being annularly spaced away from the greater portion of the vertical sides and curved centering surface of said cap.

9. In a bottle closure, the coöperating combination of, (1) a bottle comprising a lip having a bell ring at a low level of said lip, and (2) a metal cap having a vertical skirt portion thin and flexible at its lower edge, said cap covering the top of the bottle and the sides of the lip and forming a conditional seal with said bell ring; said bottle having a neck surface centripetally indrawn at a level immediately below said bell ring, said indrawn part and the lower surface of the bell ring providing for a smooth grasping and sustaining surface protective to the hand against cutting action of the lower edge of the skirt portion of said cap and providing surface in addition to said bell ring and said cap for suspending said bottle when grasped and lifted manually.

10. In a bottle closure, the combination of, (1) a lip having an outward and downward vertically rounded annular rim portion, said lip also having annularly an uninterrupted smooth formation of surface, a horizontal annular sealing seat and a downward rounded portion extending inwardly from the sealing seat and defining the open mouth of the bottle, (2) a horizontally disposed disk-gasket for said sealing seat, said disk-gasket extending outwardly from the sealing seat over the outward and downward rounded annular rim, and (3) a metal cap comprising vertical sides, a disk-gasket centering surface for centering and coöperative compression means for compressing the disk-gasket upon the sealing seat, the peripheral edge of said disk-gasket being spaced interruptedly from the vertical sides and centering surface of the cap, said disk-gasket being compressed downwardly by the cap onto the lip.

11. In a bottle closure, the coöperating combination of, (1) a bottle lip, said lip having a flat horizontal sealing seat and a curved surface extending outwardly and downwardly from said sealing seat, (2) a protective compression cap for said lip, said cap comprising a horizontal crown sheet having an annular sealing surface, a vertical skirt portion and a centering curvature between and connecting said crown sheet and skirt portion, and (3) a compressible sealing gasket forming a seal between the sealing seat of the lip and the sealing surface of the crown sheet, said gasket having a diameter extending over the two peripheral edges of the sealing seat to one side of the curved centering surface.

JOSEPH MOSES WARD KITCHEN.

Witnesses:
   GEO. L. WHEELOCK,
   BEATRICE MIRVIS.